219-121

2/24/87

SR

OR 4,645,899

United States Patent [19]

Bebber et al.

[11] Patent Number: 4,645,899

[45] Date of Patent: Feb. 24, 1987

[54] PLASMA TORCH WITH HOLLOW FLUID COOLED NOZZLE

[75] Inventors: Hans J. Bebber, Mülheim; Heinrich-Otto Rossner; Gebhard Tomalla, both of Essen, all of Fed. Rep. of Germany

[73] Assignee: Fried. Krupp Gesellschaft mit beschränkter Haftung, Essen, Fed. Rep. of Germany

[21] Appl. No.: 781,136

[22] Filed: Sep. 27, 1985

[30] Foreign Application Priority Data

Sep. 28, 1984 [DE] Fed. Rep. of Germany ....... 3435680

[51] Int. Cl.$^4$ .............................................. B23K 15/00

[52] U.S. Cl. ............................... 219/121 PN; 219/75; 219/121 PM; 219/121 PP

[58] Field of Search .................. 219/121 PM, 121 PP, 219/121 PQ, 121 PT, 121 P, 75, 74, 76.16; 313/231.31, 231.41, 231.51

[56] References Cited

U.S. PATENT DOCUMENTS

| | | | |
|---|---|---|---|
| 2,616,017 | 10/1952 | Anderson | 219/75 |
| 3,147,329 | 9/1974 | Gage | 219/121 P |
| 3,204,076 | 8/1965 | Browning | 219/121 PP |
| 3,858,072 | 12/1974 | Dembovsky | 219/121 PP |
| 4,311,897 | 1/1982 | Yerushalmy | 219/121 PP |

FOREIGN PATENT DOCUMENTS

| | | | |
|---|---|---|---|
| 1764116 | 3/1971 | Fed. Rep. of Germany . | |
| 2140241 | 6/1974 | Fed. Rep. of Germany . | |
| 2541166 | 5/1982 | Fed. Rep. of Germany . | |
| 2951121 | 11/1982 | Fed. Rep. of Germany . | |
| 3307308 | 9/1983 | Fed. Rep. of Germany . | |
| 0097364 | 5/1973 | German Democratic Rep. . | |
| 0024737 | 2/1980 | Japan | 219/121 PP |

*Primary Examiner*—M. H. Paschall

*Attorney, Agent, or Firm*—Spencer & Frank

[57] ABSTRACT

In a plasma torch having an output end, the torch including an electrode having a longitudinal axis, and a generally cylindrical nozzle body surrounding, and positioned concentrically with, the electrode and the nozzle body, the nozzle body includes: a radially symmetrical, generally cylindrical inner wall spaced radially from the electrode; a radially symmetrical, generally cylindrical outer wall surrounding, and arranged concentrically with respect to, the inner wall; a front end wall located in the vicinity of the torch output end and joining together the inner and outer walls; and an electrical insulating component forming part of at least one of the inner and front end walls and extending entirely across its associated wall for electrically insulating the inner and outer walls from one another at at least one location in the vicinity of the front end wall.

11 Claims, 13 Drawing Figures

PLASMA TORCH WITH HOLLOW FLUID COOLED NOZZLE

BACKGROUND OF THE INVENTION

The present invention relates to a plasma torch of the type composed of a central electrode and nozzle which concentrically surrounds the electrode.

During the operation of plasma torches, a stable electric arc column must form between the electrode and a counterelectrode. The central electrode is surrounded by the nozzle and is composed of a single electrode or of a centrally disposed auxiliary electrode and a primary electrode which concentrically surrounds the auxiliary electrode. The counterelectrode is provided, for example, in the form of a bath of molten metal. The desired stability of the arc and thus the efficiency and economy of operation of a system operated with such a plasma torch can here be adversely affected to a considerable degree by parasitic arcs. Such parasitic arcs burn parallel to the primary arc and include, in particular, the lower edge of the outer burner or nozzle jacket and the outer region of the frontal face of the nozzle in the current flow.

The formation of parasitic arcs involves three contiguous current paths, with the first current path being formed by an internal short circuit arc which electrically bridges the relatively short path between the electrode and the nozzle; the second current path is the metallic conductor formed by the nozzle; and the third current path is formed by a double arc burning from the outer torch or nozzle jacket or the outer region of the frontal face of the nozzle to the counterelectrode. Particularly when high intensity, liquid cooled plasma torches are used in hot furnaces, e.g. for melting scrap, such parasitic arcs may develop and may cause the premature failure of the plasma torch, primarily in that the frontal nozzle jacket or the nozzle frontal face burns through, but also due to extensive wear of the torch electrode.

To counteract this phenomenon, it is known to reduce the current intensity of the primary arc, or to at least limit it so as to thus protect the nozzles against burning through and to prevent excess wear of the electrode. See in this connection German Auslegesschrift No. 2,140,241, German Pat. No. 2,541,166, German Offenlegungsschrift No. 2,951,121 and East German Pat. No. 97,364.

Aside from the fact that in the stated cases a considerable amount of apparatus is required to detect the parasitic arcs and to reduce or limit the primary arc current, the appearance of parasitic arcs and their negative effects are merely reduced, but not reliably prevented. Moreover, measures for combatting parasitic arcs always require that the power be drastically choked off or even that the torch be turned off.

It is further known to cover the outer jacket of the nozzle with an electrically conductive layer having a high melting or sublimation point (see German Offenlegungsschrift No. 3,307,308). This layer, which may be composed, for example, of solid graphite, wears slowly and continuously under the effect of parasitic arcs and thus counteracts premature and sudden wear of the actual metallic torch nozzle. However, such protection is not only limited in time, it is also unsuitable to compensate for the poor efficiency of the system caused by the parasitic arcs. Moreover, this known protective measure does not provide protection for the central electrode since it is attacked by the internal short circuit arc.

It is also known from U.S. Pat. No. 3,147,329 to provide the frontal face of the nozzle with a heat-resistant lining. Although this provides a certain local protection for the nozzle, the generation of parasitic arcs is at most made more difficult thereby, but is not effectively prevented.

SUMMARY OF THE INVENTION

It is an object of the present invention to provide a plasma torch on which damage caused by parasitic arcs can be prevented effectively and lastingly by simple means.

The above and other objects are achieved, according to the invention, in a plasma torch having an output end, the torch including an electrode having a longitudinal axis, and a generally cylindrical nozzle body surrounding, and positioned concentrically with, the electrode to establish an annular channel between the electrode and the nozzle body. According to the invention, the nozzle body comprises: a radially symmetrical, generally cylindrical inner wall spaced radially from the electrode; a radially symmetrical, generally cylindrical outer wall surrounding, and arranged concentrically with respect to, the inner wall; a front end wall located in the vicinity of the torch output end and joining together the inner and outer walls; and electrical insulating means forming part of at least one of the inner and front end walls and extending entirely across its associated wall for electrically insulating the inner and outer walls from one another at at least one location in the vicinity of the front end wall.

By electrically separating or insulating the section of the inner wall of the nozzle adjacent the front end of the electrode unit from the section of the front wall adjacent the outer wall, it is assured that no current path can be created from the electrode unit via the frontal region of the nozzle or torch jacket or the outer region of the frontal face of the nozzle to the counterelectrode. Since the features of the present invention already reliably prevent the formation of parasitic arcs, no damage, long-term or otherwise, therefrom can occur at the nozzle and at the electrode unit.

The insulating means may include structures at two insulating locations, one structure being arranged in the front wall portion of the nozzle, it being important that this insulating structure be placed as closely as possible to the inner wall portion so that the insulated portion of the front wall is as large as possible. With this configuration of the torch, there arises the advantage that the insulating location is not directly exposed to the radial radiation of the primary arc and thus is thermally protected.

The insulating means can include a second electrical insulating structure forming part of the inner wall for electrically insulating the portion of the inner wall which is located in the vicinity of the torch output end from a portion of the inner wall which is spaced, in the direction of the axis of the electrode, from the torch output end. This offers the advantage that an internal ancillary arc which may possibly jump over to the inner wall portion of the nozzle cannot reach the outer wall of the nozzle through the nozzle or jacket mount at the rear end of the torch. For a similar purpose, the insulating means can alternatively include a second electrical insulating structure forming part of the outer wall for electrically insulating the portion of the outer wall which is located in the vicinity of the torch output end from a portion of the outer wall which is spaced, in the direction of the axis of the electrode, from the torch output end. With the arrangement of the second insulating location as just described there arises the additional advantage that it is disposed at a "cold" location of the burner and can thus be manufactured of a less heat-resistant insulating material.

In further accordance with the invention, each insulating structure is a radially symmetrical, annular body which is removably mounted in its associated wall. Each body can be a solid, homogeneous body of electrical insulating material. At least the insulating structure in the front wall can be a body of material having a high melting point and/or a cast mass of electrical insulating material. This insulating structure may also be formed of a plurality of layers composed, respectively, of electrically conductive material alternating with electrically insulating material along the front end wall. With these arrangements, the insulating rings each constitute part of the inner face of the walls of the nozzle so that these are likewise effectively cooled by the coolant flowing within the nozzle.

To be able to favorably utilize the insulating material, the insulating structure in the front wall of the nozzle may be a structure which is removably mounted in the front end wall and which is composed of first and second annular parts, or rings, disposed adjacent one another in the direction of the electrode axis, with the first part extending from the outer surface of the front end wall and being of an electrical insulating material which is resistant to alternating temperature thermal stresses and the second part extending from the inner surface of the front end wall and being of an electrical insulating material that is impermeable to water. The one ring does not need to be impermeable to water and the other ring is thermally protected.

The plasma torch according to the invention, may further include a layer of electrical insulating material disposed on the inner surface of the front wall directly adjacent the insulating structure in the front wall. This helps to augment the insulating effort at the front wall insulating location so that a cooling medium having a lower thermal conductivity can be used for operation of the torch.

It is also possible to make do with but a single insulating location if the electrical insulating means comprise a radially symmetrical insulating body forming part of the inner wall and extending, along the electrode axis, from a location spaced from the torch output end to the front end wall.

Embodiments of the present invention are illustrated in the drawing and will be described in greater detail below.

DESCRIPTION OF THE PREFERED EMBODIMENTS

Figure 1:
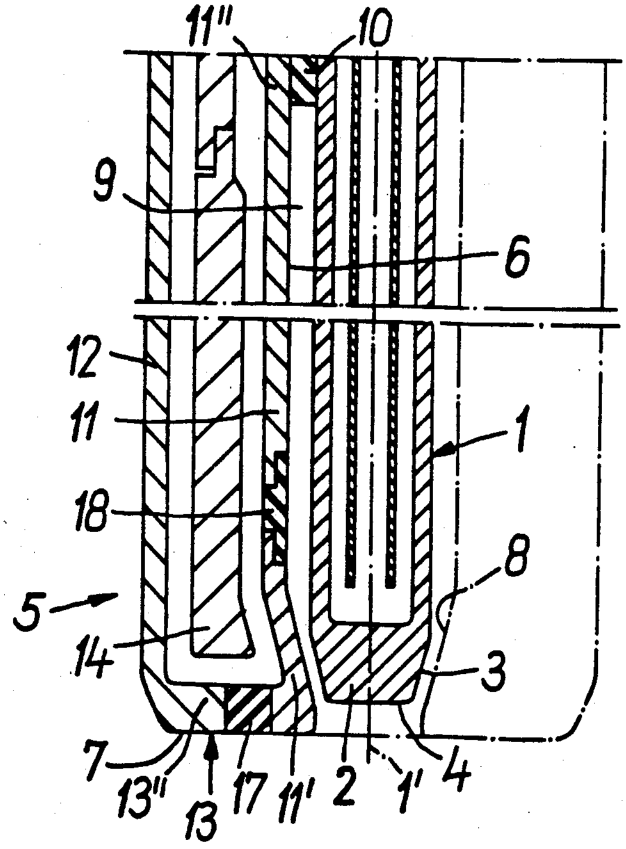
FIG. 1 is a schematic, elevational, partial sectional view of a plasma torch having a central electrode and a nozzle surrounding it. For reasons of simplicity, the right half of the nozzle is indicated merely by dot-dash lines.

The plasma torch shown schematically in FIG. 1 has a centrally disposed, rotationally symmetrical water cooled-electrode 1, whose tip 2 has a conical side face 3 and a planar frontal face 4. Electrode 1 is surrounded by a likewise water-cooled torch nozzle 5, hereinafter simply referred to as the nozzle, which is coaxial with axis 1' of electrode 1. Nozzle 5 forms an essentially cylindrical passage bore 6 terminating in a conical surface 8 so that bore 6 becomes narrower toward the frontal face 7 of nozzle 5. The inner diameter of passage bore 6 is larger than the outer diameter of electrode 1 so that an annular passage channel 9 is formed between electrode 1 and nozzle 5. To insulate nozzle 5 from electrode 1, insulating members 10 are provided as described, for example, in U.S. Pat. No. 3,147,329.

Nozzle 5 has a rotationally symmetrical inner wall 11, a rotationally symmetrical outer wall 12 arranged concentrically to wall 11 and a front wall 13 which connects together walls 11 and 12 at the frontal face of the nozzle. Between inner wall 11 and outer wall 12 there is disposed a partition 14 which contributes to the formation of the cooling water path. At the upper end of nozzle 5 (not shown), walls 11 and 12 are separated from one another in an electrically insulated manner.

In front wall 13 there is disposed a first rotationally symmetrical, electrically insulating member 17. A second rotationally symmetrical, electrically insulating member 18 is inserted at that end of the cylindrical section of inner wall 11 which is adjacent conical surface 8, or at the beginning of the cylindrical section.

Figure 2:
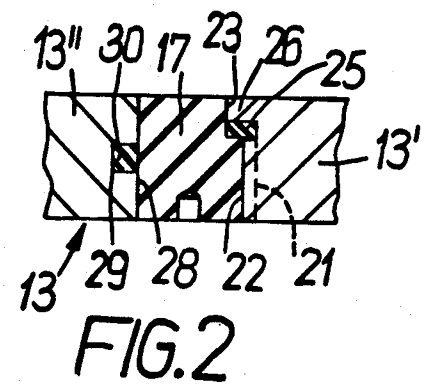
FIGS. 2 through 9 are cross-sectional detail views, to an enlarged scale, of various embodiments of the first insulating location of the torch of FIG. 1.

FIG. 2 shows a first specific embodiment of the first insulating member 17 to a larger scale. The interior of the insulating member, or ring, 17 is provided with an internal thread 21, which is in engagement with an external thread 22 at the interior portion 13' of front wall 13. Insulating ring 17 is also provided, at its interior, with an annular recess 23 which forms a step with respect to the surface bearing internal thread 21. A sealing ring 25 is seated in recess 23 and pressed against a flange 26 disposed at the inner portion 13' of front wall 13. The exterior of insulating ring 17 is cylindrical and is in engagement with a corresponding wall 28 of the exterior portion 13'' of front wall 13. To assure that no coolant flows out of the space enclosed by nozzle 5, exterior portion 13'' of front wall 13 is provided with a groove 29 into which a sealing ring 30 is placed.

In all of the embodiments to be described below, sealing rings are provided as appropriate and as shown.

Figure 3:
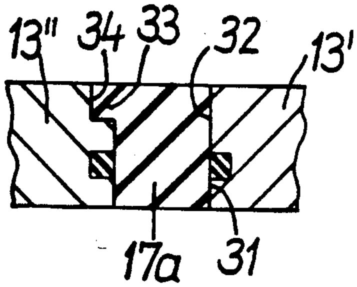

In another embodiment, shown in FIG. 3, the first insulating ring **17*a* has a smooth cylindrical interior face 31 with which it is in contact with a correspondingly cylindrical face 32 of interior front wall section 13'. The exterior of insulating ring 17*a*, at the edge facing partition 14, is provided with a flange 33 which is held in a corresponding recess 34 in the exterior front wall portion 13''. This simple embodiment assures that cooling water cannot press insulating ring 17*a* out of nozzle 5** when there is excess pressure in the nozzle interior.

Figure 4:
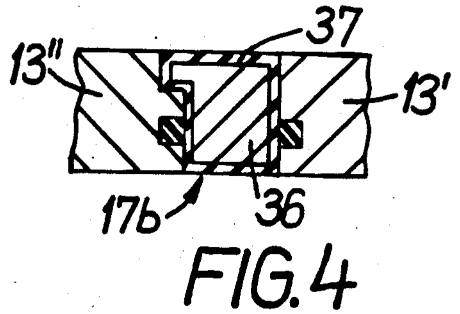

In another embodiment shown in FIG. 4, the insulating ring **17*b* has a core 36 of metallic material, e.g. copper, which is completely surrounded by a continuous surface layer, or coating, 37** of an electrically insulating material, e.g. zirconium oxide.

Figure 5:
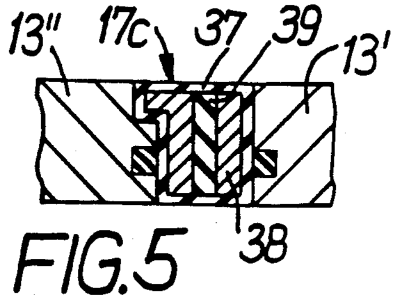

Insulating ring **17*c* of FIG. 5 is also completely surrounded by a continuous electrically insulating coating 37. In its interior, insulating ring 17*c* is formed of a plurality of concentrically assembled layers 38, 39, with at least every other layer, 39**, being an electrically non-conductive insulating layer.

Figure 6:
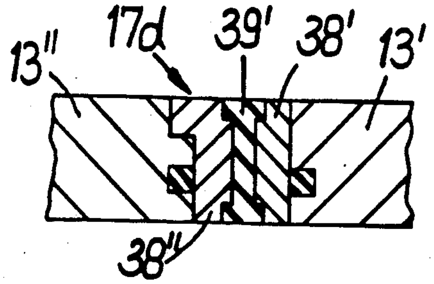

According to a modification of the FIG. 5 embodiment, the continuous insulating coating has been omitted from insulating ring **17*d* of FIG. 6. This ring is composed of two metal layers 38′, 38″ which are mechanically held together by an electrical insulating layer 39′ formed of a cast mass. The thus configured insulating ring 17*d*, seen as a whole, is more resistant to scratching and can easily be sealed against wall portions 13′ and 13″ of nozzle 5**.

Figure 7:
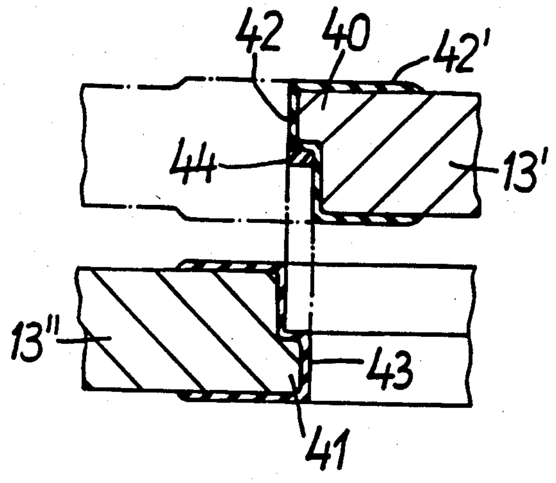

In the embodiment shown in FIG. 7, interior portion 13′ of front wall 13 and exterior portion 13″ of front wall 13, which is connected with the outer wall, are each provided with a respective flange-like projection 40 or 41, so that coaxial insertion of the two portions 13′ and 13″ with respect to axis 1′ is assured. For mutual insulation of portions 13′ and 13″, their mutually facing surfaces are each provided with an insulating layer 42 or 43, respectively, which may extend to the adjacent parallel surfaces, such as, for example, layer 42′ on the interior surface of portion 13′. A sealing ring 44 clamped between the two projections 40 and 41 makes the grooved connection watertight. FIG. 7 shows, in solid lines, the relation between portions 13′ and 13″ of inner wall 13 before installation and, in dot-dash lines, the position of exterior portion 13″ relative to interior portion 13′ after installation.

Figure 8:
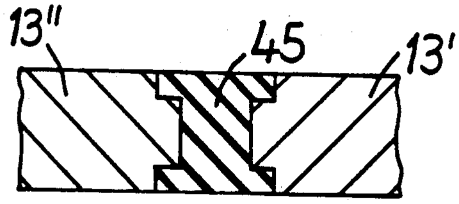

According to the embodiment of FIG. 8, the two portions 13′ and 13″ are insulated from one another by an insulating cast mass 45 being molded, in situ, to or between the associated nozzle portions 13′ an 13″. With this embodiment, sealing rings are not required. Cast mass 45 may be made of a material such as, for example, "Ceramacoat #512" (a trade mark of the Aremco Products Inc., U.S.A.) consisting essentially of silicon dioxide. Cast mass 45 may be coated for reason of tightness, if necessary, at the water side with silicone rubber.

Figure 9:
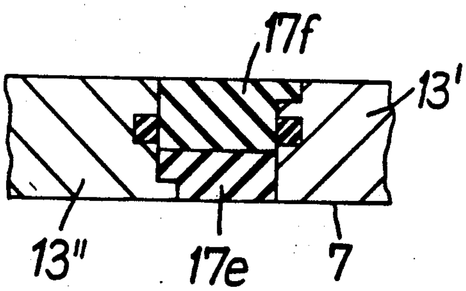

In the embodiment according to FIG. 9, the inner wall 11 of nozzle 5 is separated from its outer wall 12 in the form of an insulated location comprising two insulating rings **17*e* and 17*f* which are arranged axially behind one another. Ring 17*e*, which is flush with frontal face 7 of nozzle 5, is composed of an insulating material resistant to alternating temperature stresses and ring 17*f*, disposed behind ring 17*e***, is made of an insulating material that is impermeable to water.

Figure 10:
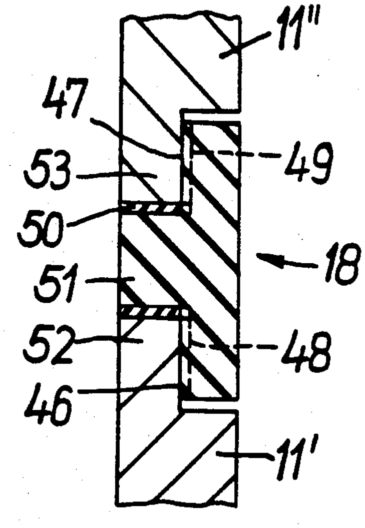
FIGS. 10 and 11 are cross-sectional views, each to an enlarged scale, of embodiments of the second insulating location of the torch of FIG. 1.

One embodiment of the second insulating ring 18 is shown in FIG. 10 and is provided with external threaded parts 46 and 47 at axially spaced external peripheral faces, the external threads engaging in corresponding internal threads 48 and 49 on front and rear sections 11′ and 11″, respectively, of inner wall 11. To seal the insulating connection, two gaskets 50 are provided which are clamped between an outwardly extending flange-like projection 51 of insulating 18 ring and axial faces of corresponding axial projections 52 and 53 of the two sections 11′ and 11″, respectively, of inner wall 11.

Figure 11:
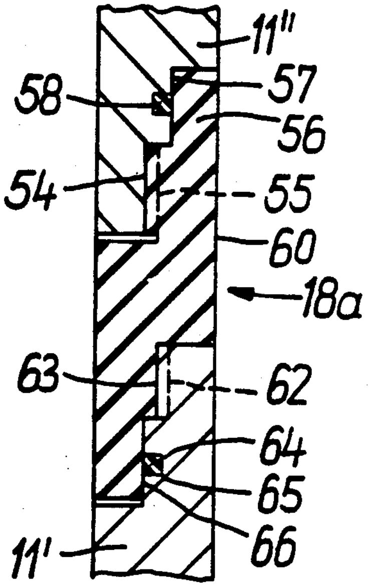

According to another embodiment shown in FIG. 11, a second insulating ring **18*a* is provided which has a somewhat zig-zag, stepped cross-section. In the vicinity of one end, insulating ring 18*a* is provided with an external thread 54 which is offset radially inwardly from the outer surface of ring 18*a* and is in engagement with a corresponding internal thread 55 in rear section 11″. At the same end, there is further provided a radially set back cylindrical part 56 which engages in a corresponding recess 57 of rear section 11″. The cylindrical connection 56/57 is sealed by an O-ring 58 which is seated in a groove in section 11′. At the opposite end of the second insulating ring 18*a*, beginning at interior face 60, there is provided a radially widened portion having an internal thread 62 which is in engagement with a corresponding external thread 63 of front section 11′ of inner wall 11. To seal insulating ring 18*a* with respect to front section 11′, an O-ring 64 is provided which is supported in a groove 65 disposed in front section 11′ of inner wall 11 and which presses against a cylindrical surface 66 of a recessed part insulating ring 18*a***.

In an exemplary case three plasma torches are arranged within a melting furnace (not shown) for melting steel scrap, the torches being electrically arranged in star connection. During operation the current may exceed to 3 kA and the arc voltage to about 300 V.

Each plasma torch is provided with insulating members or rings 17 and 18 as generally shown in FIG. 1, the first ring 17 being formed as illustrated in more detail in FIG. 3, and being made of boron nitride (BN) with an electrical resistivity of $10^{13}$ Ωcm or 10 TΩcm at standard or room temperature. The radial extension of the member or ring 17 may be 2.5 mm at the outer frontal face 7 of nozzle 5 and 6.5 mm at the inner side of front wall 13.

The second insulating member or ring 18 being made of glass ceramics having an electrical resistivity of $10^{14}$ Ωcm or 100 TΩcm and being formed as shown in FIG. 10, but the flange-like protection 51 being arranged towards the electrode 1 and the long cylindrical face being arranged towards the partition 14. The axial extension of the projection 51 may be 2 mm and the axial extension of the cylindrical face at the side of the inner wall 11 defining a part of the cooling water path may be 5 mm. The axial distance between the two insulating members 17 and 18 may be 28 mm.

Figure 12:
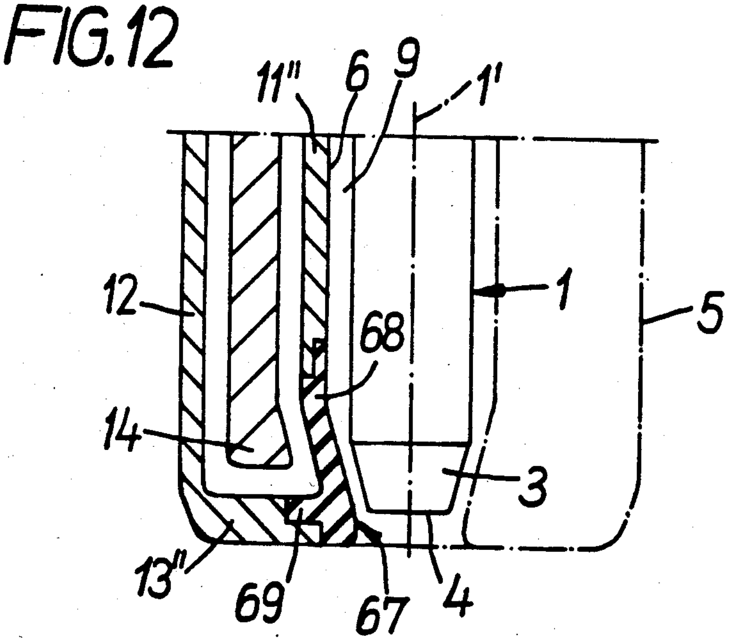
FIG. 12 is a view similar to that of FIG. 1 of another embodiment of a plasma torch equipped with an insert of insulating material.

In the embodiment shown in FIG. 12, nozzle 5 is provided, at the outlet of passage bore 6, with a rotationally symmetrical insert 67 of electrically nonconductive insulating material. When seen from frontal face 7 of nozzle 5, the rear end 68 of insert 67 is connected, behind conical side face 3 of front portion 2 of electrode 1, with a rear section 11″ of inner wall 11. At its front end, insert 67 has a flange-like collar 69 which is connected with outer wall 12 of the adjacent portion 13″ of front wall 13. Sealing of insert 67 to walls 11″ and 13″ may be performed as described in connection with FIG. 10 or 11, respectively.

In the embodiment shown in FIG. 13, the first electrically insulating member 17 is disposed in the front wall 13 as already described in connection with the embodiment according to FIG. 1. The insulating member 17 may be executed according to any form shown in FIGS. 2 to 9.

A second rotationally symmetrical electrically insulating member **18*b* is inserted in the outer wall 12 and may preferably be formed as described in connection with FIG. 10, the flange-like projection 51 being oriented to the outermost surface of nozzle 5. External threaded part 47 of member 18*b* is engaged in a corresponding internal thread of a relatively short rear section 12″ of the outer wall 12 and external threaded part 46 (see FIG. 10) is engaged in a corresponding internal thread of a relatively long front section 12′ of the outer wall 12**.

Figure 13:
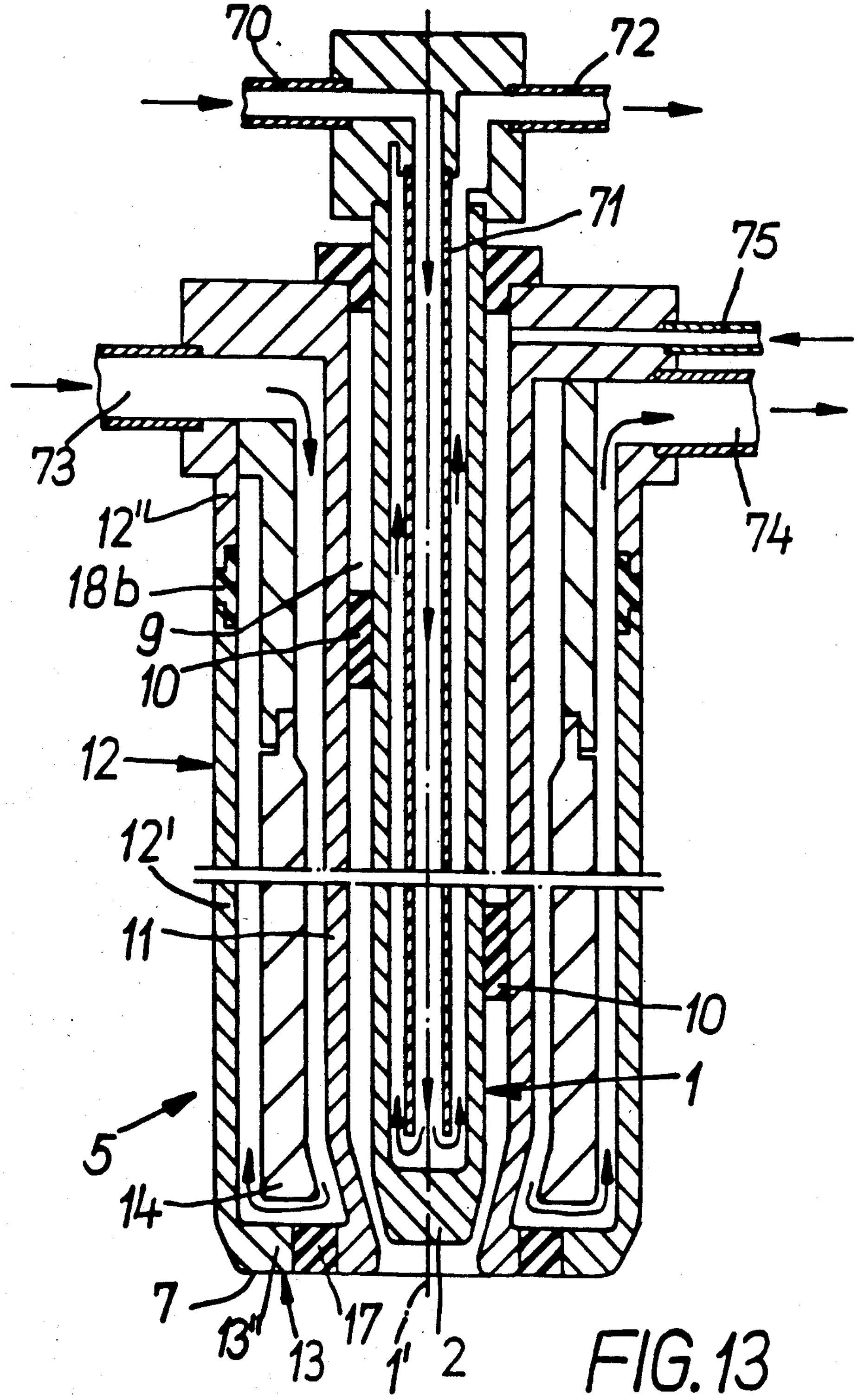
FIG. 13 is a schematic, sectional view of a plasma torch with a second insulating member disposed in the outer wall of the nozzle.

In FIG. 13 there is additionally shown the flow of the cooling water for the electrode 1 and for the nozzle 5 as indicated by arrows. The water provided for cooling the electrode 1 enters through inlet conduit or fitting 70, is forced through pipe 71 incorporated in electrode 1 towards the inner side of tip 2 and back through the annular channel defined by the inner surface of electrode 1 and the pipe 71 and flows off through a tank return conduit or fitting 72.

Electrode 1 may electrically be connected to a power source (not shown) at one of the cooling water conduits or fittings 70 or 72, respectively, or at any suitable part or element of the central head between both conduits 70 and 72.

The water provided for cooling the nozzle 5 enters through inlet conduit or fitting 73, runs through the annular channel or passage defined by the inner wall 11 and the hollow cylindrical partition 14 and further through the annular passage defined by the partition 14 and the outer wall 12, and flows off through a tank return conduit 74.

In FIG. 13 there is also illustrated the supply connection or fitting 75 for supplying an ionizable gas into and through the annular channel 9.

It will be understood that the above description of the present invention is susceptible to various modifications, changes and adaptations, and the same are intended to be comprehended within the meaning and range of equivalents of the appended claims.

What is claimed is:

1. In a plasma torch having an output end, the torch including an electrode having a longitudinal axis, and a generally cylindrical nozzle body surrounding, and positioned concentrically with, the electrode, the improvement wherein said nozzle body comprises: a radially symmetrical, generally cylindrical inner wall spaced radially from said electrode; a radially symmetrical, generally cylindrical outer wall surrounding, spaced radially from, and arranged concentrically with respect to, said inner wall to define a coolant flow space between said inner and outer walls; a front end wall located in the vicinity of said torch output end, extending perpendicular to said longitudinal axis, and joining together said inner and outer walls; and electrical insulating means forming part of at least one of said inner and front end walls and composed of first and second separate insulating structures each extending entirely across its associated wall, said first structure forming part of said front end wall for electrically insulating said inner and outer walls from one another in the vicinity of said front end wall, and said second insulating structure forming part of one of said inner and outer walls at a location spaced from said front end wall.

2. A plasma torch as defined in claim 1 wherein said second insulating structure forms part of said inner wall for electrically insulating the portion of said inner wall which is located in the vicinity of said torch output end from a portion of said inner wall which is spaced, in the direction of the axis of said electrode, from said torch output end.

3. A plasma torch as defined in claim 1 wherein said second insulating structure forms part of said outer wall for electrically insulating the portion of said outer wall which is located in the vicinity of said torch output end from a portion of said outer wall which is spaced, in the direction of the axis of said electrode, from said torch output end.

4. A plasma torch as defined in claim 1 wherein said second insulating structure electrically insulates two portions of its associated wall from one another, and wherein each of said insulating structures is a radially symmetrical, annular body which is removably mounted in its associated wall.

5. A plasma torch as defined in claim 1 wherein said first insulating structure is of a body of a material having a high melting point.

6. A plasma torch as defined in claim 1 wherein said first insulating structure is a cast mass of electrical insulating material.

7. A plasma torch as defined in claim 1 wherein said first insulating structure comprises a plurality of layers composed, respectively, of electrically conductive material alternating with electrically insulating material along said front end wall.

8. A plasma torch as defined in claim 1 wherein said front end wall has an outer surface facing in the direction of said torch output end and an inner surface facing away from said torch output end, and said first insulating structure is removably mounted in said front end wall and comprises first and second annular parts disposed adjacent one another in the direction of the electrode axis, with said first part extending from said outer surface and being of an electrical insulating material which is resistant to alternating temperature thermal stresses and said second part extending from said inner surface and being of an electrical insulating material that is impermeable to water.

9. A plasma torch as defined in claim 1 wherein said front end wall is composed of two parts and said first insulating structure comprises two layers of electrical insulating material, each said layer being deposited on a respective part of said front end wall so that when said parts are assembled together, said layers are interposed between said parts.

10. A plasma torch as defined in claim 1 wherein said front end wall has an outer surface facing in the direction of said torch output end and an inner surface facing away from said torch output end, and further comprising a layer of electrical insulating material disposed on said inner surface directly adjacent said first insulating structure.

11. In a plasma torch having an output end, the torch including an electrode having a longitudinal axis, and a generally cylindrical nozzle body surrounding, and positioned concentrically with, the electrode, the improvement wherein said nozzle body comprises: a radially symmetrical, generally cylindrical inner wall spaced radially from said electrode; a radially symmetrical, generally cylindrical outer wall surrounding, spaced radially from, and arranged concentrically with respect to, said inner wall to define a coolant flow space between said inner and outer walls; a front end wall located in the vicinity of said torch output end, extending perpendicular to said longitudinal axis, and joining together said inner and outer walls; and electrical insulating means forming part of at least one of said inner and front end walls and composed of first and second separate insulating structures each extending entirely across its associated wall, said first structure forming part of said front end wall for electrically insulating said inner and outer walls from one another in the vicinity of said front end wall, and said second insulating structure forming part of one of said inner and outer walls at a location spaced from said front end wall, said electrical insulating means comprising a radially symmetrical insulating body forming part of said inner wall and extending, along said electrode axis, from a location spaced from said torch output end to said front end wall.

* * * * *